Sept. 22, 1964 E. R. SCHMIDT 3,150,232

VARIABLE DAMPING CIRCUITS

Filed Feb. 6, 1961

*INVENTOR,*
EDWARD R. SCHMIDT

BY *Jack H. Linscott*

ATTORNEY

United States Patent Office 3,150,232
Patented Sept. 22, 1964

3,150,232
VARIABLE DAMPING CIRCUITS

Edward R. Schmidt, Tucson, Ariz., assignor to the United States of America as represented by the Secretary of the Army Filed Feb. 6, 1961, Ser. No. 87,511
8 Claims. (Cl. 179—84)

The present invention relates to an electronic tone-signal controlled switching center for a communication system and more particularly to variable damping circuits used therein for preventing narrow band-pass filters of the switching center from continuing to ring upon removal of a tone signal.

At the switching center, tone signals are used to operate the switches which select the individual signal channels. Separate frequency detector circuits are provided to achieve the detection and separation of the different tone signals. A narrow band-pass filter is used in each circuit to pass only the desired tone signal to a triggering circuit which, in turn, functions to perform the switching steps. In the past, because of the high signal level of the output from each narrow band-pass filter, and because of the high Q of the filter, the decay time at the end of each tone signal pulse was long. This ringing caused hangover in the pulse circuits following the filter. Accordingly, on many occasions false triggering of the switching circuits occurred.

It is, therefore, an object of this invention to provide means for improving the switching center for a communication system.

It is an object of this invention to provide means for preventing false tone signal detection in a switching center.

It is a further object of this invention to provide means for preventing hangover in the pulse circuits following each of the narrow bandpass filters in a switching center.

The present invention accomplishes the above objects by the utilization of a variable damping circuit in conjunction with each narrow band-pass filter. Each variable damping circuit is controlled to be conductive when there is no tone signal applied to the narrow band-pass filter to which it is connected. This causes any A.-C. signal remaining in the fiilter at the cessation of a signal to be shunted to ground by a low impedance path, and so to decay very rapidly. By this operation of the variable damping circuit each of the frequency detector circuits is immediately ready to accept a tone signal without the chance of false signal detection caused by hangover in the filters.

Figure 1:
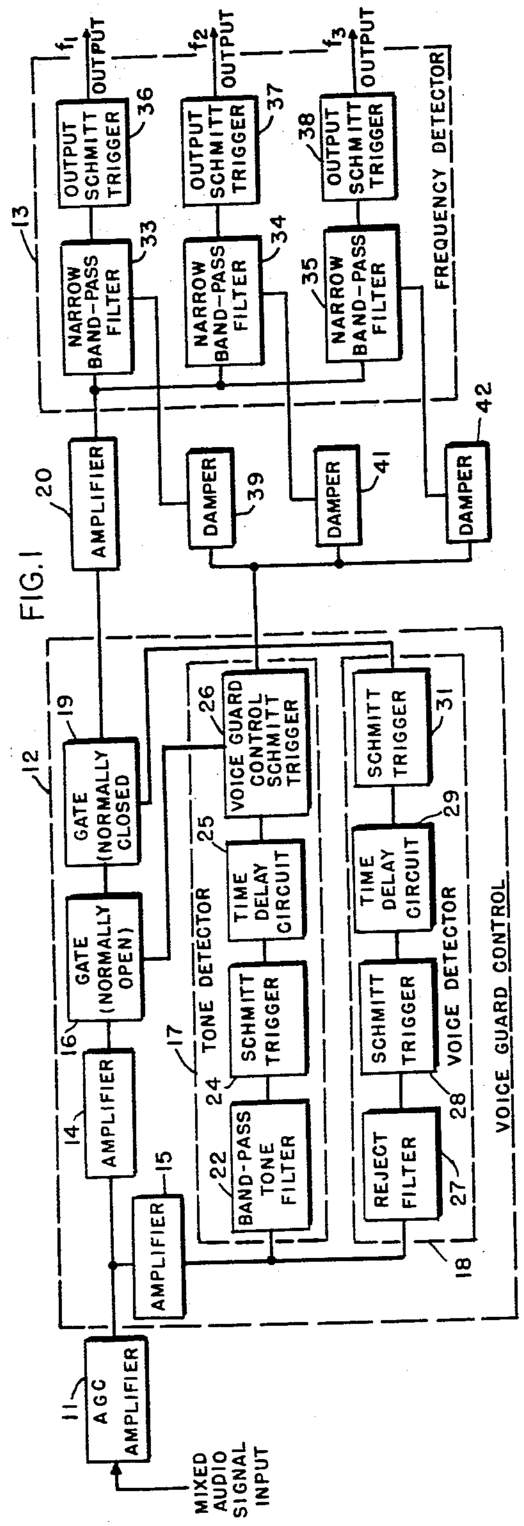
Figure 3:
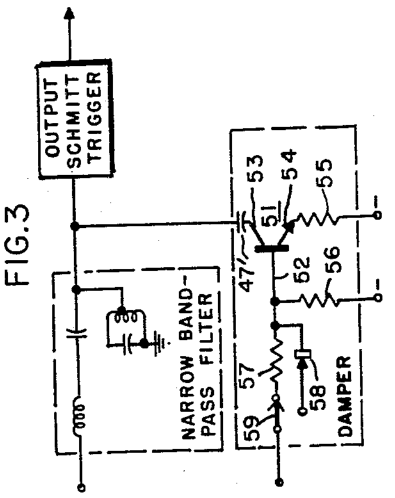
Figure 2:
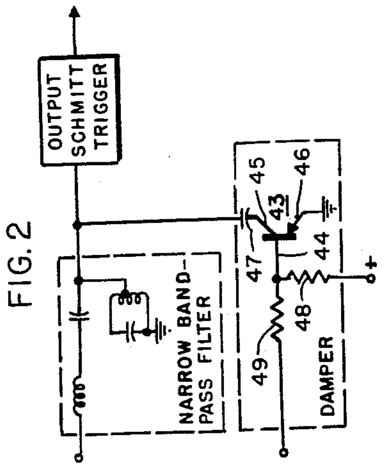

The exact nature of this invention as well as other objects and advantages thereof will be readily apparent from consideration of the following specification taken in connection with the annexed drawing in which:

FIGURE 1 is a block diagram showing the interconnection of the present invention with the switching center; and FIGURES 2 and 3 show preferred embodiments of the present invention.

The keying tone signals for switching control in the switching center, in which the present invention is used, are chosen to be within the frequency spectrum required for the transmission of audio information. This is done so that the bandwidth requirements and the expense of the communication system will be minimized. Accordingly, the keying tone signals are chosen to be in the frequency band of 1700 to 2900 cycles per second, a frequency band in which they can be best distinguished from voice information.

For a better understanding of the invention, a description of the environment in which it is used will first be presented, referring to FIGURE 1 of the drawing. The incoming voice information and tone signals are applied to automatic-gain-control (A.G.C.) amplifier 11 which sets the maximum signal level for the following circuits. The output signal from A.G.C. amplifier 11 is applied through voice guard (V.G.) control circuit 12 to frequency detector network 13.

Voice guard control circuit 12 comprises two amplifiers 14 and 15 connected to receive the output signal from A.G.C. amplifier 11, two serially connected gating circuits 16 and 19 coupled to amplifier 14 and acting as a voice guard switch, and tone detector 17 and voice detector 18 having their inputs connected in common to receive the output signal from amplifier 15. The two gating circuits 16 and 19 are controlled by tone detector 17 and voice detector 18, respectively. Gating circuit 16 is normally open and gating circuit 19 is normally closed.

Tone detector 17 includes serially connected band-pass tone filter 22, Schmitt trigger circuit 24, time delay circuit 25 and voice guard control Schmitt trigger 26. Throughout the specification Schmitt trigger should be taken as referring to a monostable device. Filter 22 is tuned to pass the tone frequency signals of 1700 through 2900 cycles per second. Schmitt trigger circuit 24 provides constant amplitude pulse to time delay circuit 25, the output of which controls the operation and release of voice guard control Schmitt trigger 26. Schmitt trigger 26 produces a D.-C. signal output, when energized with a pulsed input, this output signal being applied to gating circuit 16. When a tone signal is applied to filter 22 of tone detector 17, Schmitt trigger circuit 26 applies a gate closing signal to gating circuit 16. After this happens, the tone signal is passed by gating circuits 16 and 19 throughhh amplifier 20 to frequency detector network 13.

Voice detector circuit 18, connected between amplifier 15 and gate circuit 19, is similar to tone detector 17 but is opposite in action. Its primary purpose is to open gate 19 to prevent the passage of a signal therethrough when voice information is passed by A.G.C. amplifier 11. This circuit prevents voice frequency signals from passing to frequency detector network 13 (provides voice immunity) unless actual tone signals are passed by A.G.C. amplifier 11.

Voice detector circuit 18 includes serially connected band reject filter 27, Schmitt trigger circuit 28, time delay circuit 29 and Schmitt trigger circuit 31. Band reject filter 27, designed to compliment tone filter 22, passes any or all frequency signals which fall outside the tone frequency signal band. Schmitt trigger circuit 31 provides a D.-C. signal output of opposite polarity to that provided by voice guard control Schmitt trigger circuit 26. Accordingly, in the presence of voice signals, the D.-C. signal from Schmitt trigger circuit 31 opens gating circuit 19, preventing signals from passing therethrough.

The delay circuits 25 and 29 are used to delay the operation of the tone detector and voice detector circuits, respectively, because of the operating characteristics of the A.G.C. amplifier. The delay they provide allows the output of the A.G.C. amplifier to stabilize. The first few cycles of A.G.C. output are highly distorted. Because of this, if they are allowed to pass on to the detector circuits, the distortion produced would operate the voice gate circuit and block the signal. The time delay of audio delay circuit 29 is adjusted to operate faster and release later than time delay circuit 25. This method of operation provides a high degree of voice immunity.

Detector network 13 is shown as including three separate frequency detector channels, each channel having a narrow band-pass filter 33, 34 or 35, and an output Schmitt trigger circuit 36, 37 or 38 for controlling switching circuits (not shown). According to the frequency of the tone signal at the output of amplifier 20, one of the narrow band-pass filters passes the signal to the output Schmitt trigger circuit to which it is connected.

Due to the hangover problem that developed in detector network 13, discussed above, three damper or variable damping circuits 39, 41 and 42 have their inputs connected in common with voice guard control Schmitt trigger 26 in tone detector 17 and their outputs connected to narrow band-pass filters 33, 34 and 35, respectively. Damper or variable damping circuits 39, 41 and 42 are controlled by voice-guard control Schmitt trigger 26 to conduct when the Schmitt trigger 26 is in its normal condition (no tone signal being passed by A.G.C. amplifier 11). Accordingly, any A.-C. signal lingering at any of the narrow band-pass filters finds a low impedance path to ground through the variable damping circuit to which it is connected. The variable damping circuits thus perform two very important functions: preventing hangover in the narrow band-pass filters from causing false switching, and causing the channels of detector network 13 to be ready to accept successive tone signals in a very short interval, to considerably improve switching speed. This they do by providing means for effecting a rapid decay upon removal of the tone signal, each quench circuit acting as a low impedance path for any A.-C. signal lingering at the narrow band-pass filter to which it is attached.

In FIGURE 2 there is disclosed one embodiment of the variable damping circuit of my invention. P N P transistor 43 has base 44, collector 45 and emitter 46. Capacitor 47 connects collector 45 to the particular narrow band-pass filter with which the quench circuit is to cooperate. This capacitor is large enough to provide an A.-C. short when the transistor conducts, and at the same time achieve D.-C. isolation between the frequency detector circuit and the quench circuit. Emitter 46 is connected to ground, and base 44 is connected through resistor 48 to a positive bias potential and through resistor 49 to voice guard control Schmitt trigger circuit 26.

On the application of a tone signal input having the necessary tone signal-to-noise and tone signal-to-voice ratios, to voice guard control circuit 12, the voice guard control circuit will pass the tone signal to the narrow band-pass filters 33, 34 and 35 and, by action of voice guard control Schmitt trigger circuit 26, turn off the transistors of variable damping circuits 39, 41 and 42, removing the A.-C. short from the narrow band-pass filters 33, 34 and 35.

Since each filter resonates at a particular frequency, the tone signal is passed by only the filter tuned to the signal frequency. The output signal from the filter is applied to the output Schmitt trigger circuit which produces square-waves from the signals applied to the filters to control switching circuits (not shown).

At the instant the tone signal is removed from voice-guard control circuit 12, voice-guard control Schmitt trigger circuit 26 returns to its normal condition, causing gating circuit 16 to open and the transistors of the variable damping circuits 39, 41 and 42 to conduct. This shorts to any A.-C. signal remaining in any of the narrow band-pass filters to ground, preventing hangover.

Another embodiment of the variable damping circuit is shown in FIGURE 3. This comprises an N P N transistor 51 having base 52, collector 53 and emitter 54. Large capacitor 47', connected between collector 45 and a narrow band-pass filter, serves the same purpose as capacitor 47 of FIGURE 2. Emitter 54 is connected through resistor 55 to a negative potential source and base 52 is connected through resistor 56 to a negative bias potential and through resistor 57 or diode 58, according to the position of switch 59, to voice guard control Schmitt trigger circuit 26. This embodiment is prevented from conducting on the application of a negative signal from Schmitt trigger 26 to base 52.

Diode 58 is used in N P N transistor circuit 51, in place of resistor 57, for temperature compensating purposes. As the P N P circuit has no temperature problem, the diode is not necessary. The diode will also act to isolate the parallel variable damping circuits from each other.

The polarity of the signal applied from voice guard control Schmitt trigger circuit 26 to the quench circuits will determine whether the arrangement of FIGURE 2 or FIGURE 3 will be used.

The foregoing disclosure relates to a preferred embodiment of the invention. Numerous modifications or alterations may be made therein without departing from the spirit and the scope of the invention as set forth in the appended claims.

What is claimed is:

1. A switching center for a communication system comprising band-pass filter means for passing a single frequency tone, means connected to said filter for variably damping oscillations which may occur in said filter, a voice guard control circuit having a tone frequency signal output and a control signal output, first connecting means connecting said tone frequency signal output to said filter means, and second connecting means for connecting said control signal output to said variable damping means.

2. The switching center of claim 1 wherein said variable damping means comprises a P N P transistor having base, emitter and collector electrodes, a capacitor connected between said collector and said filter means, a positive potential source, a first and a second resistor each having an end connected in common with said base, the other end of said first resistor being connected to said positive potential source, the other end of said second resistor being connected to said second connecting means, said emitter being connected to ground.

3. The switching center of claim 1 wherein said variable damping means comprises an N P N transistor having base, emitter, and collector electrodes, a capacitor connected between said collector and said filter means, a negative potential source, a diode and a first resistor each having an end connected in common with said base, the other end of said first resistor being connected to said negative potential source, the other end of said diode being connected to said second connecting means, a second resistor connected between said base and said negative potential source.

4. In a transmission system: a detecting means for detecting tone signals, said detecting means having a plurality of channels with a common input, each of said channels comprising a narrow band-pass filter tuned to resonate at a particular frequency and forming said input, and an output circuit connected to said filter; a tone signal gating means connected to said common input of said channels for applying tone signals thereto; damping circuits, equal in number to the number of said channels, one of such damping circuits being connected to the respective filter of each of said channels, said damping circuits having a common input; and a control means connected to said common input of said damping circuits for rendering them non-conductive in synchronism with said tone signals and conductive upon removal of said tone signals.

5. The transmission system of claim 4 wherein each of said damping circuits comprises a transistor having a base, emitter and collector electrode; a source of potential connected to said emitter and said base; a capacitor connected between said collector and said narrow band-pass filter, said control means being connected to said base.

6. In a switching center for a communication system, an input circuit for supplying audio frequency signals; an audio frequency gating circuit connected to said input circuit; band-pass tone filter means connected to said input circuit; a narrow band-pass filter, having a narrower band width than said band-pass filter means, connected to said gating circuit; trigger means connected to said band-pass filter means for developing a control signal in response to reception of a tone signal; means connecting said trigger means to said gating circuit; and means connected to said narrow band-pass filter and to said trigger means for short-circuiting said narrow band-pass filter upon cessation of a tone signal.

7. In a switching center for a communication system, a first channel comprising a gating circuit and a frequency detector connected in series, said frequency detector comprising a plurality of narrow band-pass filters having their inputs connected in parallel, each of said narrow band-pass filters being tuned to a different frequency; a second channel comprising a band-pass filter and a trigger circuit connected in series, said trigger circuit having first and second output terminals; and a variable damping circuit connected to each of said narrow-band-pass filters; said first output terminal being connected to said gating circuit and said second output terminal being connected to each of said variable damping circuits.

8. A variable damping circuit for a narrow band-pass filter comprising: a narrow band-pass filter; first input means for supplying a tone signal to said filter; a transistor having base, collector and emitter electrodes; biasing means connected to said base and emitter electrodes; a capacitor connected between said collector electrode and said filter; and second input means connected to said base electrode for causing said transistor to assume a state of full conduction when said tone signal ceases, so that any oscillations in said filter will be completely damped.

References Cited in the file of this patent

UNITED STATES PATENTS

| | | |
|---|---|---|
| 2,456,016 | Owen | Dec. 14, 1948 |
| 2,741,701 | Harris | Apr. 10, 1956 |
| 2,830,128 | Radcliffe et al. | Apr. 8, 1958 |
| 2,883,473 | McDermott | Apr. 21, 1959 |
| 2,883,474 | Fritschi | Apr. 21, 1959 |
| 2,885,575 | Clumen | May 5, 1959 |
| 2,914,683 | Terry | Nov. 24, 1959 |
| 2,935,572 | Hastings et al. | May 3, 1960 |
| 2,964,650 | Radcliffe et al. | Dec. 13, 1960 |
| 3,026,863 | Reynolds et al. | Mar. 27, 1962 |